United States Patent [19]

Mason

[11] E Re. 28,977

[45] Reissued Sept. 28, 1976

[54] METHOD FOR THE CONSTRUCTION OF A RETAINING WALL

[75] Inventor: Edward E. Mason, Vancouver, Canada

[73] Assignee: Shotcrete Engineering, Ltd., Vancouver, Canada

[22] Filed: Jan. 25, 1974

[21] Appl. No.: 436,446

Related U.S. Patent Documents

Reissue of:

[64] Patent No.: 3,638,435
Issued: Feb. 1, 1972
Appl. No.: 24,510
Filed: Apr. 1, 1970

[52] U.S. Cl. ..... 61/39; 52/169 R; 52/742

[51] Int. Cl.[2] ..... E02D 5/18; E02D 5/36

[58] Field of Search ..... 61/39, 49, 35; 52/169, 52/742, 741, 443

[56] References Cited

UNITED STATES PATENTS

| | | | |
|---|---|---|---|
| 1,762,343 | 6/1930 | Munster | 61/39 |
| 3,371,494 | 3/1968 | Lagerstrom | 61/39 |

FOREIGN PATENTS OR APPLICATIONS

| | | | |
|---|---|---|---|
| 567,623 | 10/1957 | Italy | 61/39 |
| 104,024 | 2/1917 | United Kingdom | 61/39 |

*Primary Examiner*—Jacob Shapiro
*Attorney, Agent, or Firm*—Frank C. Lowe

[57] ABSTRACT

A retaining wall for supporting the embankment of a cut excavation. The wall structure consists of a skin of concrete, an array of rows and columns of dowels or tendons extending from the skin into the cut embankment and rows of wale beams at the juncture of dowels and the face of the skin tying the components together. The retaining wall is built as the cut proceeds. A cut to a selected depth is covered by a skin of pneumatically applied concrete. The dowels are formed as reinforcing, grout-filled boreholes and the wale beams are formed as reinforced concrete members pneumatically sprayed against the skin.

10 Claims, 14 Drawing Figures

METHOD FOR THE CONSTRUCTION OF A RETAINING WALL

Matter enclosed in heavy brackets [ ] appears in the original patent but forms no part of this reissue specification; matter printed in italics indicates the additions made by reissue.

This invention relates to retaining walls, and more particularly to methods for the construction of retaining walls to support banks alongside cuts and excavations.

Conventional types of retaining walls include a footing at the base of the wall and a restraining means to prevent the wall from overturning. Such a restraining means may be a heavy, wide footing, or a buttress, or tension members extending into the earth behind the wall as in the manner disclosed in the U.S. Pat. to S. E. Webb, et al., No. 3,250,075 issued May 10, 1966. In many construction projects, the expense of building a retaining wall can become a major cost item of the project and sometimes the cost for building a retaining wall appears to be excessive, especially when the structure is to be temporary. Also, there exists an urgent need for a better and more simple method for building a retaining wall to support an embankment behind a cut while the excavation operations are under way and to build the retaining wall as fast as the excavation operations can proceed, as in situations where time is of the essence.

The present invention was conceived and developed with the foregoing and other considerations in view, and comprises, in essence, a retaining wall structure and a method for building a retaining wall to support an embankment behind a cut as excavation operations proceed, by the use of pneumatically applied concrete to form a skin upon the face of the cut to bond with the earth mass and by using an array of grout-filled boreholes to form dowels or tendons to securely hold the skin in place and to stabilize the earth mass behind the skin.

An object of the present invention is to provide a novel and improved method for building a retaining wall for a cut which involves simple, quick and economical steps that can proceed with dispatch during excavation operations and which will provide a minimum of interference or delay with the excavating operations.

Another object of the invention is to provide a novel and improved retaining wall for a cut which can be easily designed to restrain an embankment of any specified height, which can be used with any types of soil, and which, when completed, is a rugged, stable structure.

Another object of the invention is to provide a novel and improved method for building a retaining wall against an earth embankment wherein the weight of the soil in the embankment is advantageously used to stabilize itself and hold the retaining wall to thereby eliminate the need for footings, butresses and conventional tension members.

Another object of the invention is to provide a novel and improved retaining wall for the support of an embankment which forms a strong, rugged, stable structure with a minimum of material.

A further object of the invention is to provide a novel and improved retaining wall for cuts which can be built rapidly and at such a low cost that it may be advantageously used as a temporary structure in construction projects in lieu of sheet piling and the like.

With the foregoing and other objects in view, my present invention comprises certain constructions, combinations and arrangements of materials and certain sequences, operations and steps, all as hereinafter described in detail, defined in the appended claims, and illustrated in the accompanying drawings in which:

Figure 1:
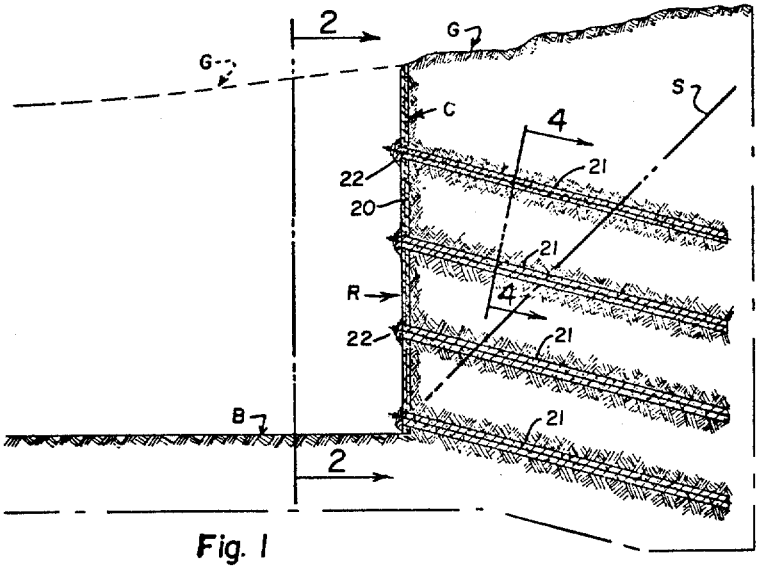
FIG. 1 is a transverse sectional elevation view depicting an excavation cut and the resulting soil embankment secured to and stabilized by a retaining wall constructed according to the principles of the invention.

Referring more particularly to the drawing, FIG. 1 depicts a typical excavation cut below a ground surface G. The original ground surface is illustrated as extending over the cut in broken lines. The excavation depth is to a designated base surface B and in the drawing, the wall cut C is illustrated as being vertical and is held by the improved retaining wall R. A vertical cut is not essential and the wall cut C may also be sloped and whenever this slope is steeper than the natural angle of repose of the soil, the cut C must be held by a retaining wall.

The improved retaining wall R is formed as a rigid skin 20 at the surface of the wall cut C. This skin, formed against the cut face of the embankment as hereinafter described, is also securely held in place by tendons or dowels 21, which are arranged in columns and rows connecting to the skin and extending into the embankment. These dowels 21 preferably extend from the face of the wall cut C and into the embankment a selected distance. They dip slightly from the horizontal to facilitate filling them with grout, all as will be hereinafter further described. The retaining wall R [is] *may be* further reinforced and rigidified by rows of concrete wale beams 22 at the outer face of the skin and each wale intersects a row of dowels 21, the dowel locations being indicated at FIGS. 2 and 3 by locations of anchor plates as hereinafter described. *In certain circumstances, for example, where the soil is sufficiently firm or where the excavation is relatively shallow, concrete wale beams are unnecessary and may be dispensed with.*

Figure 4:
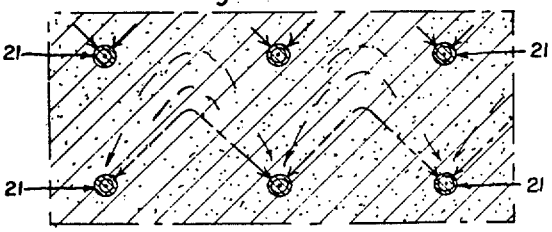
FIG. 4 is a fragmentary sectional view as taken from the indicated line 4—4 at FIG. 1 and with arrows and broken lines indicating the soil pressure action against rigid members forming the retaining wall supports.

The proper spacing [or] *of* rows and columns of the dowels, and their distance into the earth embankment, can be established by common methods of analysis. Such analyses will give due consideration to the type and stability of the soil in the embankment, the depth of the cut, the presence of ground water, if any, and the effect of any loads which might be imposed upon the ground surface G of the embankment above the cut. By spacing the dowels in rows and columns, *if columns are desirable*, the earth mass of the embankment acts as a monolithic structure because the array of dowels, arranged in rows and columns, resist earth pressures and adjacent dowels in each row provide a resultant arch action of the earth as suggested by the indicated arrows at FIG. 4. The dowels thus function to support the weight of the soil and to prevent the formation of slip planes, such as that indicated as S at FIG. 1.

Figure 2:
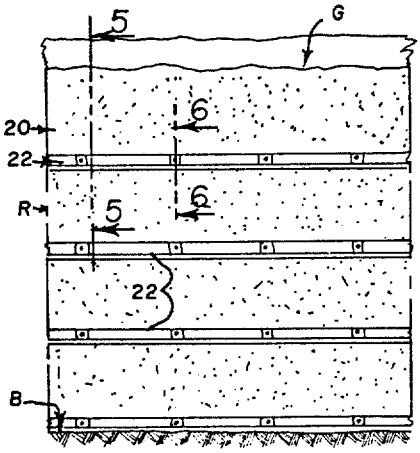
FIG. 2 is a front elevation view of a portion of the cut face held by the retaining wall, as taken from the indicated line 2—2 at FIG. 1.
Figure 3:
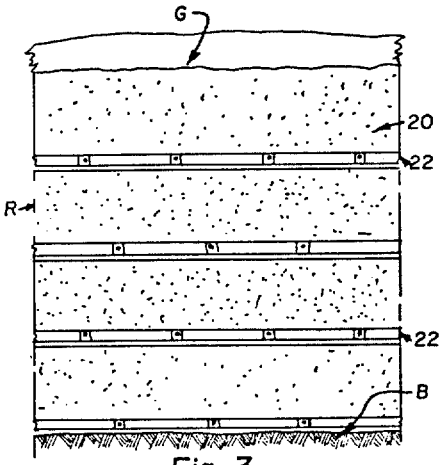
FIG. 3 is a front elevation view similar to FIG. 2, but showing connection points in a staggered arrangement.

Certain factors are limitative in the design of a retaining wall according to the present invention. The height between [columns] *rows* is preferably between 4 to 6 feet, but is limited to a height to which a freshly cut bank of soil will stand for a short period of time, at least until the skin 20 can be applied, and a reasonable range of height would be from 2 to 12 feet. The width of spacing between dowels may also be varied, but is preferably within the range of ½ to 1½ times the height in order to form a pattern wherein all of the dowels will act together, as through the arching action indicated at FIG. 4. It is to be noted that the free standing height of a cut of earth will automatically establish a reasonable dowel spacing within the earth for any given type of earth encountered, so the dowels can cause the earth embankment to act as a monolithic structure. Also, it it to be noted that the pattern of rows and columns of dowels may not only be regular as illustrated at FIG. 2, but also staggered as illustrated at FIG. 3.

Figure 5:
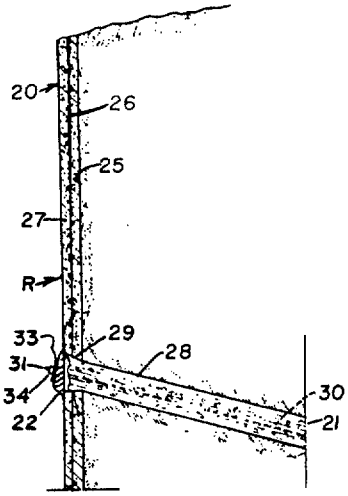
FIG. 5 is a fragmentary transverse section of a portion of the wall, as taken from the indicated line 5—5 at FIG. 2, but on an enlarged scale.
Figure 6:
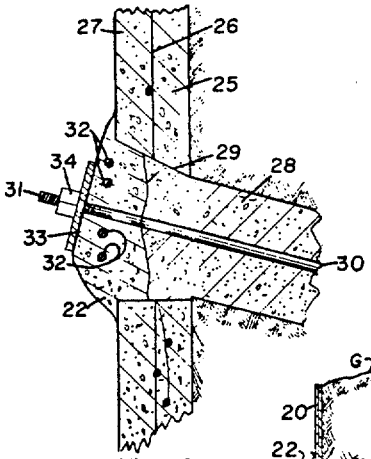
FIG. 6 is a fragmentary sectional detail, as taken from the indicated line 6—6 at FIG. 2, and is similar to FIG. 5 but on a further enlarged scale.

The structural organization of the improved retaining wall is illustrated in further detail at FIGS. 5 and 6. The skin 20 is formed upon a freshly cut bank and includes a first layer 25 of pneumatically sprayed concrete as will be hereinafter described. This skin is applied as horizontal strips, each strip being normally 4 to 6 feet high and covering the surface of the freshly cut bank of soil. Pneumatic concrete, blown against the bank with considerable force as a semiliquid material, effectively bonds with the bank soil and the cohesion of the concrete with the earth is not less than the natural cohesion within the soil itself. Preferably, the concrete mix will include accelerators to reduce the set time of the portland cement used in the concrete to speed up the construction of the wall. Commerical methods of spraying pneumatically applied concrete are well known and need not be described herein. The product is sometimes referred to as Shot Crete and also as Gunnite.

After approximately 2 inches of pneumatic concrete is sprayed to form the first layer 25, a reinforcing mesh 26 is then placed upon the face of the freshly formed layer 25 with a suitable lap at the base as will be described. Thereafter, a second layer 27 of pneumatic concrete, approximately 2 inches thick, is sprayed upon the first layer to complete the skin.

The dowels 21 are formed by boreholes 28 which extend through openings 29 in the skin and thence, into the embankment. The boreholes are substantially normal to the cut C although they will preferably slope downwardly at a comparatively flat angle, not more than approximately 15°. The borehole is then filled with a concrete grout to form the dowel 21, the slight downward slope preventing the grout from flowing out of the hole. A reinforcing rod 30 is then placed in each borehole before the grout sets. Usually this reinforcing rod may be pushed into the grout by a simple manual operation. If trouble is encountered in keeping the reinforcing rods within the cylindrical body of grout, simple guides may be provided on the end of the rods to center each rod 30 in the borehole 29. An end portion 31 of this rod extends outwardly from the borehole and through the opening 29 in the skin to facilitate securing the dowel to a wale beam 22 as will be described. The size of each borehole [will] *may* vary from 4 to 8 inches and the grout filling the same will effectively bond to the earth about it to produce, over the surface of the dowel, a very substantial shear resistance even though the unit shear resistance of the soil may be very low.

*If preferred, the concrete grout may be stopped short of the face of the concrete skin and, provided there is a means for locking the dowels to the concrete skin, such as the bearing plate 33 and fastener described hereinbelow, the effectiveness of the retaining wall will not be impaired. Indeed, the absence of concrete grout adjacent the skin may facilitate the tensioning of the concrete dowel.*

[The] *If* wale beams 22 *are required, they* function to effectively tie the entire structure together. These horizontal beams are formed at levels defined by rows of dowels and the projecting portions 31 of the rods 30 extend from the center of the concrete wales 22. Forms may be used to shape these wale beams 22, however, a skillful operator can spray concrete in such a manner as to cause the beam to merge into the concrete wall, as small ridges. The proportions of each wale 22 may thus vary substantially, but a preferred size is approximately 12 inches wide and 2 to 4 inches thick, with reinforcing rods 32 being placed in the wale beams at the top and bottom portions of each wale beam. Once these reinforcing rods are secured in position along a horizontal course, the concrete is sprayed against the skin structure forming a unitary beam 22. When the beam 22 is formed, the openings 29 in the skin are also filled to tie together the dowels 21, the skin 20 and beams 22. To more securely tie these components together against tension a bearing plate 33, having a hole in its center, is fitted over the projected end 31 of the reinforcing rod 30 and a nut 34 or a similar fastener is fitted upon the end of the rod 30 to pull the bearing plate in position against the beam 22.

Figure 7:
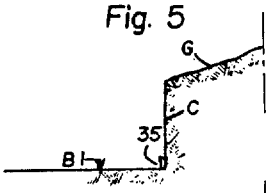

A preferred method of constructing a retaining wall according to the present invention is diagrammatically illustrated at FIGS. 7 through 14, where the retaining wall is built as the excavation proceeds, the excavation proceeding in sequential stages as will be described. FIG. 7 illustrates a first stage of excavation which will be below the ground surface a distance of 4 to 6 feet to a base B1 and so limited that the cut C will remain vertical for a short period of time which is sufficient to apply a strip of the skin 20. The earth excavation to the base B1 is immediately below the level of the first row of boreholes. As illustrated in the drawings, a row of dowels 21 will be formed in the earth embankment *preferably* adjacent the toe of this excavation and plugs 35 may be placed on the ground, at the toe of the excavation to form openings 29 in the skin 20 [where] *when* the dowel holes are to be drilled *before the skin is formed.* However, such plugs are entirely optional, for the drilling equipment to drill the grout holes can ordinarily drill through the skin or the holes may be cut in any other suitable manner. *For example, a first layer 25 of the skin may be applied before drilling the dowel holes, or the dowel holes may be drilled as a last step.*

Figure 8:
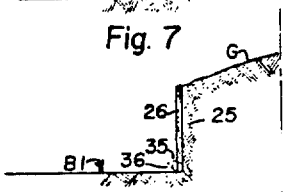
Figure 9:
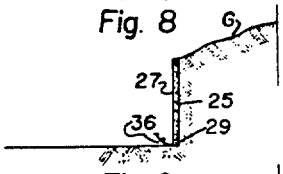

The first layer 25 of the skin concrete is [then] sprayed against the cut wall C. Next, a wire mesh sheet 26 is positioned against the layer 25 with a short extra amount for a lap 36 at the toe of the excavation being folded outwardly from the cut wall as illustrated at FIG. 8. Next, the first strip of the skin section 20 is completed by applying the outer layer 27 of concrete, as illustrated at FIG. 9.

Figure 11:
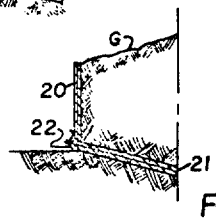
FIGS. 7 through 14 are small-scale diagrammatic sections of an excavation site illustrating a sequence of the steps in the construction of a retaining wall according to the invention.
Figure 10:
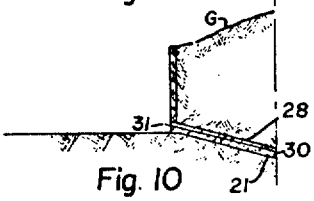

The plugs 35, if used, may then be removed and the first row of dowels 21 is formed by drilling boreholes, filling them with grout and then inserting reinforcing rods 30 with the rod ends 31 projecting from each borehole, as illustrated at FIG. 10. Finally, the first wale beam 22 is formed to complete this top strip of the retaining wall as illustrated at FIG. 11.

Figure 12:
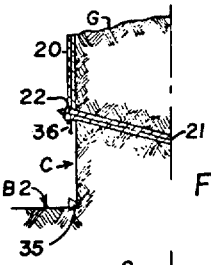
Figure 13:
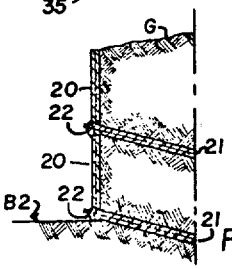

The formation of this top strip of the retaining wall can ordinarily be completed in a short time period of a day, or at most a few days. As soon as the wale beam 33 is formed, the excavation of the cut may be continued to a lower stage to a base level B2 as illustrated at FIG. 12, to prepare a second strip of the retaining wall. The excavation is undercut with respect to the top strip of the retaining wall to provide a continuous cut wall. To prepare the second strip of the retaining wall, plugs 35 are placed at the toe of the cut, the bottom lap 36 of the wire mesh of the upper layer is pulled downwardly and a first layer of the concrete skin is then sprayed against the cut wall W. Next, another wire mesh sheet 26 is placed against the concrete layer 26 of the second strip and the outer layer 27 of concrete is applied. Thereafter, the plugs 35, if used, are removed and the second row of dowels 21 and the second wale beam 22 are formed to complete the second strip in the same manner as heretofore described. The resulting structure with the two strips of a completed retaining wall appears as illustrated at FIG. 13.

Figure 14:
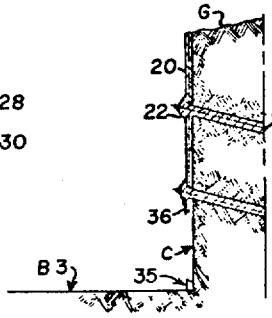

Thereafter, excavation continues to another lower stage to a base level B3 to prepare for a third strip of the retaining wall as illustrated in FIG. 14. The operations described above are again repeated to form a third strip of the retaining wall and subsequent repeated operations as the cut progresses will complete the retaining wall, to any desired depth of cut, such as to the base B illustrated at FIG. 1.

I have now described my invention in considerable detail. However, it is obvious that others can devise and build alternate and equivalent constructions and equivalent sequences and operations which are nevertheless within the spirit and scope of my invention. Hence I desire that my protection be limited not by the constructions illustrated and described, but only by the proper scope of the appended claims.

I claim:

1. In a method of forming a retaining wall for an excavation cut for restraining an embankment of earth, including the steps of:

a. forming a skin against the excavation cut with pneumatically applied concrete;

b. forming reinforced dowels in a general arrangement of rows, one above the other, and extending from the skin into the earth embankment by drilling boreholes therein, inserting reinforcing rods into the boreholes with end portions of the rods projecting from the boreholes and filling the boreholes with grout;

c. forming wale beams along the dowel rows with pneumatically applied concrete directed against the skin, against the ends of the dowels and about the reinforcing rod projections; and d. applying a locking means at the ends of the reinforcing rod projections to secure the [wall] *wale* beams to the dowels and thereby integrate the components into a unitary structure.

2. In the method set forth in claim 1, including the further step of:

providing a bearing plate on each reinforcement rod projection to abut against the [wall] *wale* beam thereof, with said locking means at the end of the reinforcement rod projection bearing against the bearing plate.

3. In the method defined in claim 1, including the further steps of:

a. cutting the embankment in stages comprising horizontal strips;

b. applying the aforesaid skin to an exposed strip of cut embankment;

c. affixing a row of dowels and a wale beam in place near the toe of the exposed strip; and thereafter d. excavating the earth to expose another strip and to form the next succeeding stage of the cut.

4. In a method of forming a retaining wall for an excavation cut for restraining an embankment of earth, including the steps of:

a. forming a skin against the excavation cut with pneumatically applied concrete;

b. forming dowels in a general arrangement of rows, one above the other, and extending from the skin into the earth embankment by drilling boreholes therein and filling the same with grout; and c. forming wale beams along the dowel rows by pneumatically applied concrete against the skin and against the ends of the dowels whereby to integrate the components into a unitary structure.

5. The method of forming a retaining wall as set forth in claim 4, wherein the formation of the skin includes the steps of:

a. spraying a layer of pneumatically applied concrete against the wall of the cut;

b. applying reinforcing wire mesh to the freshly sprayed layer; and c. spraying another layer of concrete onto the first; wherein the formation of the dowels includes the step of:

a. inserting a reinforcing rod into each dowel before the grout is set, with a portion of the same extending through and from the face of the wale beam at the row; and wherein the formation of the wale beam includes the preliminary step of:

a. placing a longitudinal reinforcing rod against the skin within the course of the beam.

6. In the method set forth in claim 5, including the further step of providing a bearing plate at each dowel reinforcing rod extension and applying a fastening means at this extension to tightly secure the rod to the plate.

7. In the method defined in claim 4, including the further steps of:

a. cutting the embankment in stages comprising horizontal strips;

b. applying the aforesaid skin to an exposed strip of cut embankment;

c. affixing a row of dowels and a wale beam in place near the toe of the exposed strip; and thereafter d. excavating the earth to expose another strip and to form the next succeeding stage of the cut.

*8. A method of forming a retaining wall for an excavation cut for restraining an embankment of earth, including the steps of:*

*a. forming a skin against the excavation cut with pneumatically applied concrete;*

*b. forming reinforced dowels in the general arrangement of rows, one above the other, and extending from the skin into the earth embankment, by drilling boreholes therein, placing grout and reinforcement rods in the boreholes with the end portions of the rods projecting therefrom through the skin;*

*c. providing a bearing plate on each reinforcement rod projection to abut against the skin; and*

*d. applying a locking means at the ends of the reinforcement rod projections with the locking means bearing against the bearing plate to secure the skin to the dowels and thereby integrate the skin and dowels into a unitary structure.*

*9. The method of forming a retaining wall as set forth in claim 8, wherein the formation of the skin includes the steps:*

*a. spraying a layer of pneumatically applied concrete against the wall of the cut;*

*b. applying reinforcing wire mesh to the freshly sprayed layer; and*

*c. spraying another layer of concrete onto the first; and wherein the formation of the dowels includes the steps of inserting a reinforcing rod into each dowel before the grout is set, with a portion of the rod extending through and from the face of the skin.*

*10. The method defined in claim 8, including the further steps of:*

*a. cutting the embankment in stages comprising horizontal strips;*

*b. applying the aforesaid skin to an exposed strip of cut embankment;*

*c. affixing a row of dowels in place near the toe of the exposed strip; and thereafter*

*d. excavating the earth to expose another strip and to form the next succeeding stage of the cut.*

* * * * *